(12) United States Patent
Robbins et al.

(10) Patent No.: US 7,062,650 B2
(45) Date of Patent: Jun. 13, 2006

(54) SYSTEM AND METHOD FOR VERIFYING INTEGRITY OF SYSTEM WITH MULTIPLE COMPONENTS

(75) Inventors: Virginia L Robbins, Hillsboro, OR (US); Lewis V Rothrock, Hillsboro, OR (US); Carlos V Rozas, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 533 days.

(21) Appl. No.: 09/967,738

(22) Filed: Sep. 28, 2001

(65) Prior Publication Data

US 2003/0159055 A1    Aug. 21, 2003

(51) Int. Cl.
*H04L 9/00* (2006.01)

(52) U.S. Cl. ...................................... 713/167; 713/165
(58) Field of Classification Search ................ 713/200, 713/167, 165

See application file for complete search history.

(56) References Cited

U.S. PATENT DOCUMENTS 5,287,408 A * 2/1994 Samson ........................ 705/59
6,363,486 B1 * 3/2002 Knapton, III ............... 713/200

* cited by examiner

*Primary Examiner*—Gilberto Barron, Jr.
*Assistant Examiner*—Grigory Gurshman
(74) *Attorney, Agent, or Firm*—Steven P. Skabrat (57) ABSTRACT

A system and method for verifying integrity of a system with multiple components includes a plurality of related object components that forms the software system, a signed binary description file manager that generates a signed binary description file (SBDF) to store verification and license information of the plurality of related object components, and a verification agent that verifies itself and the plurality of related object components. The manager associates unique identification (ID) names that represents the related object components with corresponding sets of component license information, and stores the associations in the signed binary description file. The verification agent retrieves license information pertinent to itself and each of the related object components utilizing the SBDF. The verification agent verifies the related object components after verifying its own integrity.

22 Claims, 4 Drawing Sheets

SYSTEM AND METHOD FOR VERIFYING INTEGRITY OF SYSTEM WITH MULTIPLE COMPONENTS

BACKGROUND OF THE INVENTION

1. Field of the Invention

The present invention generally relates to data security and content protection. More specifically, the present invention relates to a system, method and storage medium embodying computer-readable code for verifying the integrity of a system with multiple components.

2. Discussion of the Related Art

Network computer systems and public networks, such as the Internet, hold tremendous potential for many industries. The network computer systems and public networks provide users with vast amount of data that can be quickly and cost effectively accessed from virtually anywhere. The Internet, for example, allows users to access databases such as web page servers from any computer connected to the Internet. Along with the emergence of public networks and network computer systems comes an imperative need to not only preserve the confidentiality of some of the sensitive information traveling on the network and between computer system, but to also prevent unwanted taking by unauthorized users of the computer systems. If such measure is not taken, sensitive, private, licensed, or copyrighted information may be accessed, modified, or intercepted by an unauthorized party. The problem is especially alarming in electronic media distribution and digital rights management, where the distributors wish to control distribution and distribute the content only to authorized users. Therefore, network computer systems, and the software systems therein, must be able to confirm the identity of their users or visitors before granting access to private information and to make sure that the security of the software systems is not compromised. A user or visitor as referred to herein is a person or a program that interacts with the program modules.

In order to combat these attacks, users need methods of authenticating the origin of the software system and validating the integrity of the software system. Many existing methods today address one aspect of the problem, but not the other, especially in light of the continuing improvement in computer technology. In the past, most of the software systems contain a few components that need to be signed and verified. With the advent of technology, software systems now contain many components, most of which relate to each other and which need to be signed and verified. For example, a large system contains multiple object components—plug-ins, codes, agents, modules, etc.—that are related to each other. These multiple object components are utilized in different combinations to carry out different functions for the system.

In order to keep the integrity of the software system intact and prevent unwanted interception or modification, the integrity of these multiple object components needs to be established before they are allowed to act in the system. A conventional method for providing signature and verification of closely related components is to use multiple binary description files for each component. Before the action of each object component is to be performed, information needed for verification and other operation is extracted from its corresponding binary description file. Therefore, when a verification agent needs to verify different object components that are part of a group that is to carry out a certain function for the system, the verification agent has to parse a multitude of binary description file. More importantly, the verification agent has to keep track of all the binary description files, wasting resources and making the job complex and time consuming. Using a different binary description file for each component makes complex a binary description file distribution system. Managing many binary description files, one for each components, adds complexity and overhead to normal software operation. Therefore, there is a need for a new system and method of verifying the integrity of a system with multiple components, reducing the expense of signature verification.

BRIEF DESCRIPTION OF THE DRAWINGS

The accompanying drawings, which are incorporated in and form a part of this specification, illustrate embodiments of the present invention and, together with the description, serve to explain the principles of the present invention.

DETAILED DESCRIPTION

Reference will now be made to the preferred embodiments of the invention, examples of which are illustrated in the accompanying drawings. While the present invention will be described in conjunction with the preferred embodiments, it will be understood that they are not intended to limit the invention to these embodiments. On the contrary, the present invention is intended to cover alternatives, modifications and equivalents, which may be included within the spirit and scope of the invention as defined by the appended claims. Moreover, in the following detailed description of the present invention, numerous specific details are set forth in order to provide a thorough understanding of the present invention. However, the present invention may be practiced without these specific details. In other instances, well-known methods, procedures, components and circuits have not been described in detail as not to unnecessarily obscure aspects of the present invention.

Embodiments of the present invention are directed to a verification system, method and storage media embodying computer-readable codes for signing and verifying the integrity of a system with multiple related components from one signed binary description file (SBDF), which is a file comprising, at least in part, a binary description of the integrity of multiple object components. The embodiments use a unique SBDF to store verification and license information of all closely related object components. Multiple object components, such as program modules, are allowed to be signed in a single SBDF. As used herein, a program module is any identifiable portion of a computer program code or any sequence of programming instructions in any programming language.

In one embodiment, the verification system comprises a group of closely related object components, a signed binary description file manager, a SBDF common to the closely related object components and a verification agent. The group of closely related object components may, for example, be a group of codes, plugins, agents and modules that are related to each other. Together, the group of closely related object components forms a software system, wherein the object components are required to be signed and verified. Each of the object components that needs to be signed and verified are associated with a unique identification name and corresponding component license information, which allows an object component to be verified. The signed binary description file manager stores the component license information along with its unique identification name in the common SBDF. The relationships between each object components may be freely defined at the discretion of a designer. In one implementation, information related to all the components is stored in the SBDF as a separate license. During the verification process, the verification agent starts by searching the SBDF for the unique identification names of the components to be verified. The verification of a group of related object components may be done in a sequential manner, in a parallel manner, or a mix of both. Once the unique identification name of a component is found, the verification agent retrieves all the related license information pertinent to the particular component. Verification is then undertaken before the object component is allowed to carry out its service.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" or "according to an embodiment" appearing in various places throughout the specification are not necessarily all referring to the same embodiment.

Figure 1:
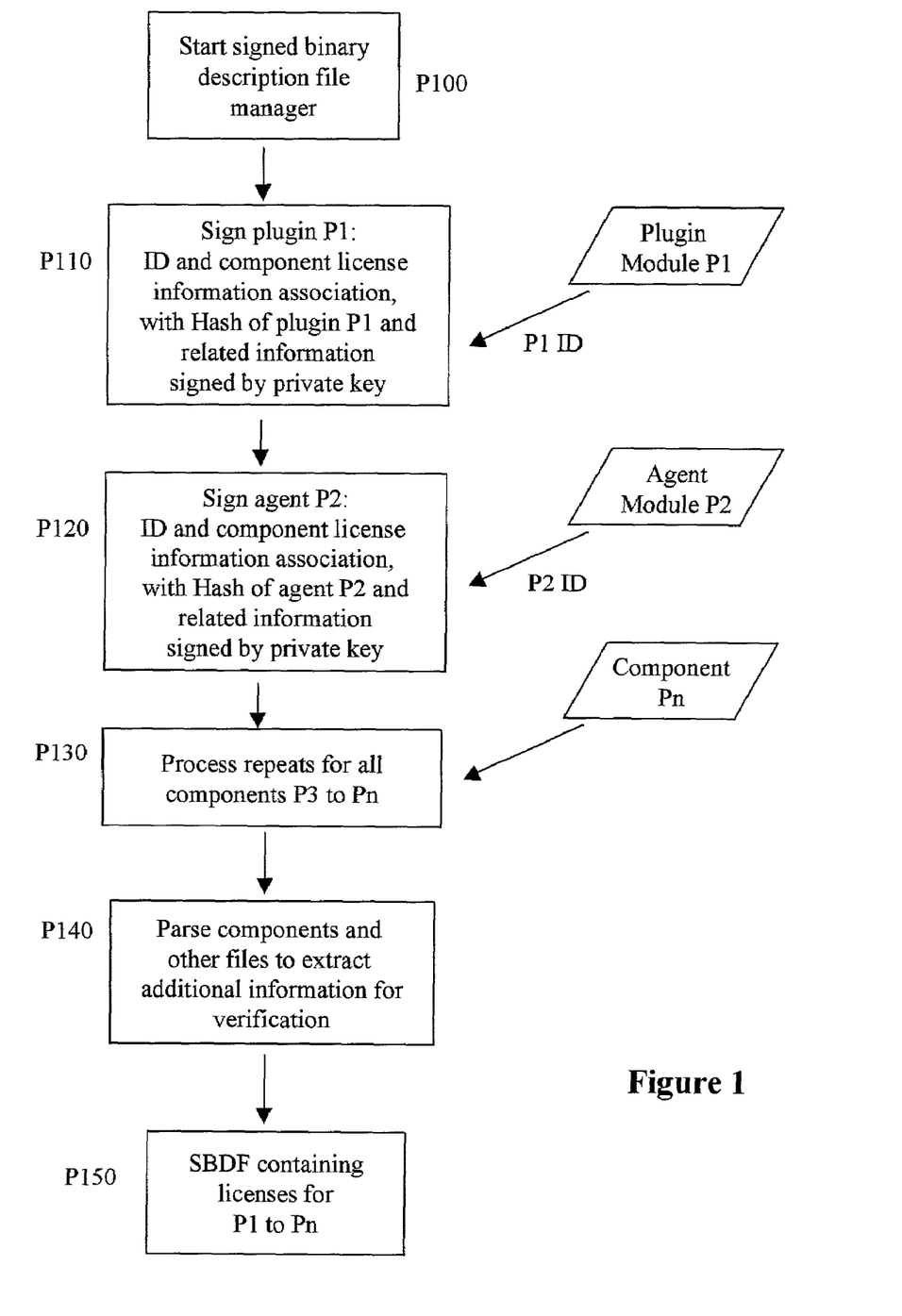
FIG. 1 illustrates a flow diagram for generating a signed binary description file for a group of related object components according to an embodiment of the present invention.

FIG. 1 illustrates a flow diagram for generating a SBDF for a group of related object components according to an embodiment of the present invention. In block P100, a program tool used to generate SBDF is started. In one implementation, the program tool is a signed binary description file manager that puts together the SBDF. For example, C programming language may be used to implement the program tool, with the program running as executable files or dynamic modules/components, such as dynamic link library (DLL) files or shared files. The terminology of the "dynamic modules/components" may vary depending on the operating system environment, including, but not limited to, Microsoft Windows, Unix, Linux and Macintosh. In other implementations, other programming language, a hardware equivalent, or other format is utilized for implementing the signed binary description file manager. The signed binary description file manager reads a configuration file specified in the command line. The configuration file contains information that makes the SBDF generation possible. For example, the configuration file provides information pertaining to the number of object components in the SBDF file, the unique identification names of the object components, the file paths to the object components, the type of the object components, the type of hash algorithm used, additional user information, a relocation table, a map file, passwords, or other information related to the object components. A file path to an object component may be a full path or a path relative to the directory in which the object component, or the tool for forming the object component, resides. Examples of the type of object components include Windows based program modules, program modules based on other operating systems or programming language, agents, and drivers. As used herein, an agent refers to a body of code that provides an hidden execution based on the technology disclosed in U.S. Pat. No. 5,892,899, "Tamper Resistant Methods and Apparatus," by David Aucsmith and Gary Graunke. Additional user information is any user attribute, which may include a callback address and the value used in a program module for doing a particular action. The map file is a file generated when producing an executable file or a dynamic module/component that lists all the functions and variable offsets in the binary. The passwords may, for example, be used to unwrap private keys. Other information related to the object components may, for example, be information that is needed for the verification process of these object components.

In block P110, component P1 is signed and included in the SBDF. The signed binary description manager parses the configuration file and reads in the first unique identification name. In this example, the first unique identification name is the unique identification for a plugin module P1, which may be a DYNAMIC MODULE/COMPONENT, a shared object, or any equivalent. In one implementation, the unique identification name is a unique string that becomes embedded in the SBDF. The signed binary description manager then reads, from the configuration file, information that is related to the plugin module P1, and if necessary, information from the plugin module P1 itself obtained from utilizing the configuration file. Together, the read information is referred to as component license information of the plugin module P1, with the component license information representing information related to a particular object component. The signed binary description manager stores the unique identification of the plugin module P1 along with the component license information in the SBDF. In one implementation, the component license information corresponding to the unique identification for the plugin module P1 includes associated hash of the plugin module P1 and private or public keys associated with the plugin module P1. For example, the associated hash of the plugin module P1 and the related information may be signed using a private manufacture's key, creating a digital signature. This digital signature is associated with the unique ID name of the plugin module P1, along with other information/attributes in the component license information. For example, two different kinds of additional attributes may be stored, one being user attributes and the other being reserved attributes. The user attributes are those that can be added by the user when creating the SBDF, such as the hash algorithm type, the plugin module P1 type, and some information necessary for validating the plugin module P1. The reserve attributes are for attributes that usually are not able to be entered in the configuration file used by the signed binary description file manager for creating the SBDF, such as information residing solely at the plugin module P1.

In block P120, the same process is performed on component P2, signing and including component P2 in the SBDF. In this example, component P2 is a verification agent module. In other embodiments, component P2, as well as component P1, may be any kind of object components. It is only important that each object component in the SBDF has a unique identification. An unique identification for the agent module P2 is stored in the SBDF along with the component license information of the agent module P2. The component license information represents information related to the agent module P2. As described in block P120, a hash of the agent module P2 and related information are signed using the private manufacture's key. This digital signature is associated with the unique ID of the agent module P2, along with other information/attributes in the component license information corresponding to the unique ID. Likewise, the same process is repeated for every other object component specified in the configuration file, as shown in block P130. In this example, the signing process is repeated for all object components P3 to Pn.

In block P140, based on additional information specified in the configuration file, the signed binary description file manager parses the object components, e.g., P1 to Pn, and other files to extract additional information needed for the verification process. In parsing the configuration file, the signed binary description file manager may, for example, read keywords and associated actions or information. Once the signed binary description file manger has completed parsing the configuration file, it proceeds to parse each object component for other related information. This is achieved by looking at the object component file path information in the configuration file. Example of the additional information needed for the verification process includes DLL relocation information, callback information/ addresses, keys, etc. As used herein, callback information allows a callback methodology to be employed to complement return address checks to further protect program module calls. In this example, a callback function is a portion of software within an object component, such as the plugin module P1, that is callable by another program module, such as a software program that verifies whether a program image corresponds to a supplied digital signature. The signed binary description file manager then formats all the information extracted in such a manner that allows easy retrieval during the verification process. In one embodiment, this specially formatted information will then be saved in the SBDF, and in particular, in the component license information portion. The specially formatted information includes all the information generated for component P1 to Pn. Thus, in addition to the unique identification and the digital signature or the hash of an object component, the component license information corresponding to the object component may further include callback information and other attributes. In one implementation, the configuration file includes a filename to be used for the SBDF, and the SBDF is established using the filename. As shown in block P150, the SBDF contains licenses for P1 to Pn.

In one embodiment, a set of predefined information that relates to all the object components is stored in the SBDF as a separate license. This separate license is herein referred to as a "content license." In one embodiment, the content license affords a user "rights" to use a particular item. In one implementation, the component license information portion of the SBDF is linked to the content license through a trusted root key found in the content license. In other implementations, other methods are used to link the component license with the content license. The rook key is used to verify the signature of the component license. If the signature is valid, then the content license authorizes the set of components identified in the component license to be used, provided that the set of components has not been tampered. With the content license, the component license information related to each unique identification no longer needs to store information that relates to all the object components. This saves space and resources during signing of the SBDF and verification of the object components, thereby increasing the speed of the signing and verification processes. When a program module, such as a verification module or a client program, needs information that relates to all the object components, it simply reads the content license to retrieve the needed information. Intrinsically, the program module knows the type of information to retrieve. An example of information related to the whole system is a user rights level to run a program, i.e., whether a user has rights to use all the object components of the program. [deleted]

Figure 2:
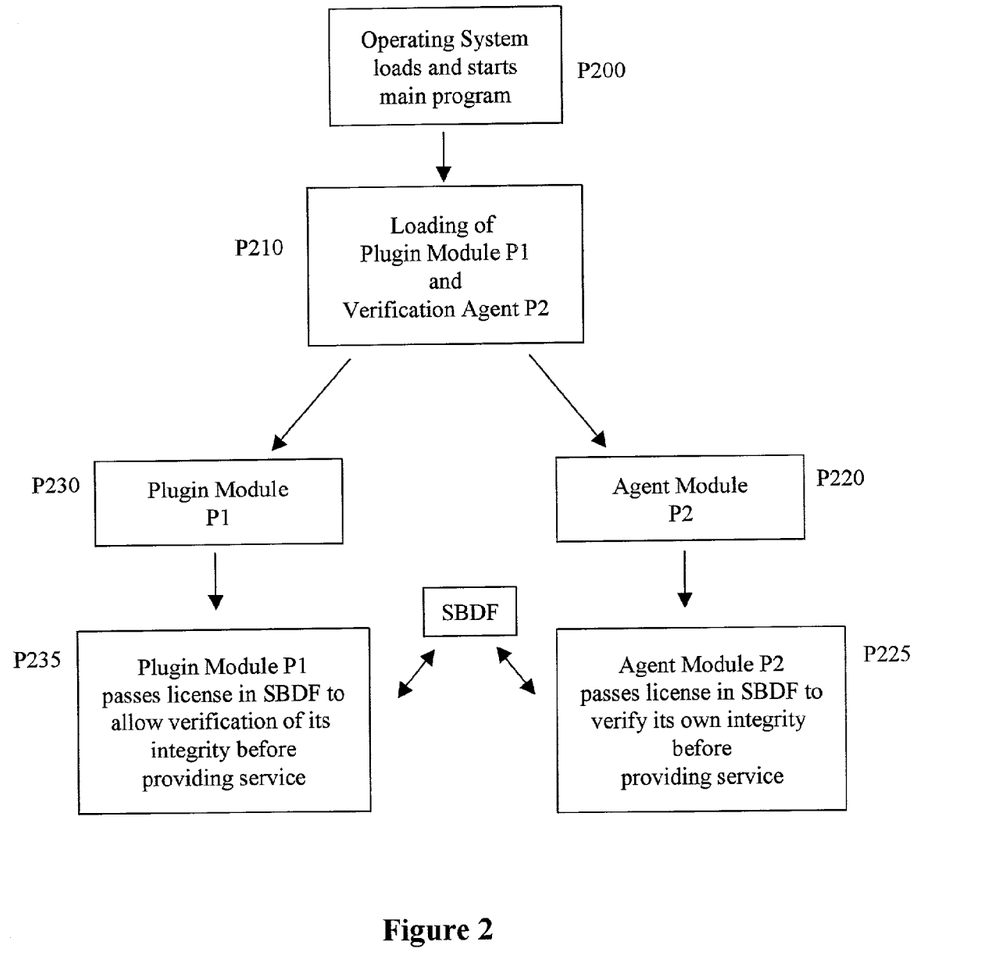
FIG. 2 illustrates a flow diagram of a multiple components verification process according to an embodiment of the present invention.

The SPDF thus generated includes verification and license information of all closely related object components. FIG. 2 illustrates a flow diagram of a multiple components verification process according to an embodiment of the present invention. In one implementation, the verification agent is in executable binary code format. However, the verification agent can be in any form like the signed binary description file manager. In block P200, the operating system loads and starts execution of a main process application, or a main program. For example, the main process application may be a digital data playing/downloading application that plays/ downloads music, video or other multimedia content. In this case, the operating system loads the digital data playing application. At this point, a few static components are loaded along with the main jukebox executable files to pre-resolve path information of dynamic modules/components. This may, for example, be achieved on the basis of information in a component database. In one embodiment, the static components and the main process provide interfaces to allow a user to interact with the main process. The interaction generally requires the user's identity to be authenticated and the components related to the main process to be verified and/or linked together in a secured manner.

In block P210, when the user clicks on an action or demands an action to be performed, the main process application loads specific object components that allow the action to be performed. The object components may, for example, be a program module, an agent module, code, plugin, or other structures. In the context of digital data player, actions that a user wishes to carry out may, for example, be playing a song, loading a song to a portable device, or transcoding. In the example shown in FIG. 2, performing the particular action requires loading different object components, namely the plugin module P1 and the verification agent module P2. In other embodiments, other object components may be invoked in place of or in combination with the object components shown in FIG. 2. The plugin module P1 is loaded in block P230, and it is used to execute the particular action. The verification agent module P2 is loaded in block P220, and it is used to execute the verification process of not only itself but also all the related component(s). In this case, the related component is the plugin module P1 for carrying out the particular action.

In block P225, the verification agent module P2 opens the common SBDF and searches for the unique identification related to itself. Once the unique identification is found, the verification agent module P2 uses the component license portion associated with the unique identification to verify its own integrity before starting the verification of other components. The component license portion, as its name suggests, is utilized to see if the verification agent module P2 is licensed to be used within a program that contains multiple object components. In one embodiment, with the help of a SBDF parser library, the verification agent module P2 retrieves a pointer that points in the SBDF to all the information related to a particular component, which may be itself or another component that it wishes to verify. Through application program interface calls to the parser library and parsing the component pointer, the verification agent module P2 retrieves different reserve and user attributes associated with the component on as needed basis. For example, the attributes extracted from the component license portion likely includes keys and other information needed to proceed with the verification of itself. In one implementation, verification is performed by looking at the digital signature, among other information, in the component license portion. In this case, the digital signature is deciphered by utilizing the signer's public key. According to an embodiment of the present invention, the verification agent module P2, searches for unique identifications of the related components along with the unique identification of itself. The verification agent module P2 also retrieves all the keys and other information needed to proceed with the verification of itself and the verification of the other predefined components. In another embodiment, the verification module P2 does not search for the unique identifications of the related components to retrieve information needed for verifying the related components until after the verification agent module P2 has verified itself.

Once verification has been completed for the verification agent module P2, it becomes capable of performing verification for the other components. Sometimes, a verification agent module performs additional functions. For example, in the context of an audio data player, the verification agent module P2 may perform not only the verification process, but also the decryption of each audio frame. The verification agent module P2 uses keys and other information extracted from the content license and its component license portion of the SBDF to decrypt the audio frames. In block P235, the plugin module P1 parses the SBDF to search for its unique identification and verifies its own integrity before providing its service. In the context of an audio data player, where the user has requested a song to be played, the plugin module PI may be an audio decoder plugin that plays decrypted audio frames. Verification of the integrity is aided by the "verified" verification agent module P2, which extracts keys and other information necessary to proceed with the verification of the plugin module P1.

Moreover, other verification schemes may be included in the SBDF verification process without exceeding the scope of the present invention. For example, before block P210 is carried out, an agent module may be loaded to analyze predefined information related to all the object components. In one embodiment, the agent module checks the content license in the SBDF to determine whether a user has rights to run the program, or a portion thereof, and use all the components related to the running of the program, or a portion thereof. This may be seen as a type of user authentication, i.e., a mechanism to prevent unauthorized users from running the program. It is noted that although only the plugin module P1 and the verification agent module P2 are loaded in the exemplary process shown in FIG. 2, other components P3 to Pn may be loaded in place of or in combination with the two modules P1, P2 depending on the particular action that is to take place. Some components may be loaded and unloaded depending on what the user wants to do. In a complex program or operation, more components are likely to be loaded.

Embodiments of the present invention may be implemented in hardware or software, or a combination of both. In one embodiment, the present invention is implemented as computer programs executing on programmable systems comprising at least one processor, a data storage system, at least one input device, and at least one output device. The program may be implemented in a high level procedural or object programming language to communicate with a processing system. The programs may also be implemented in assembly or machine language, if desired. In fact, the invention is not limited in scope to any particular programming language. In any case, the language may be a compiled or interpreted language.

Figure 3:
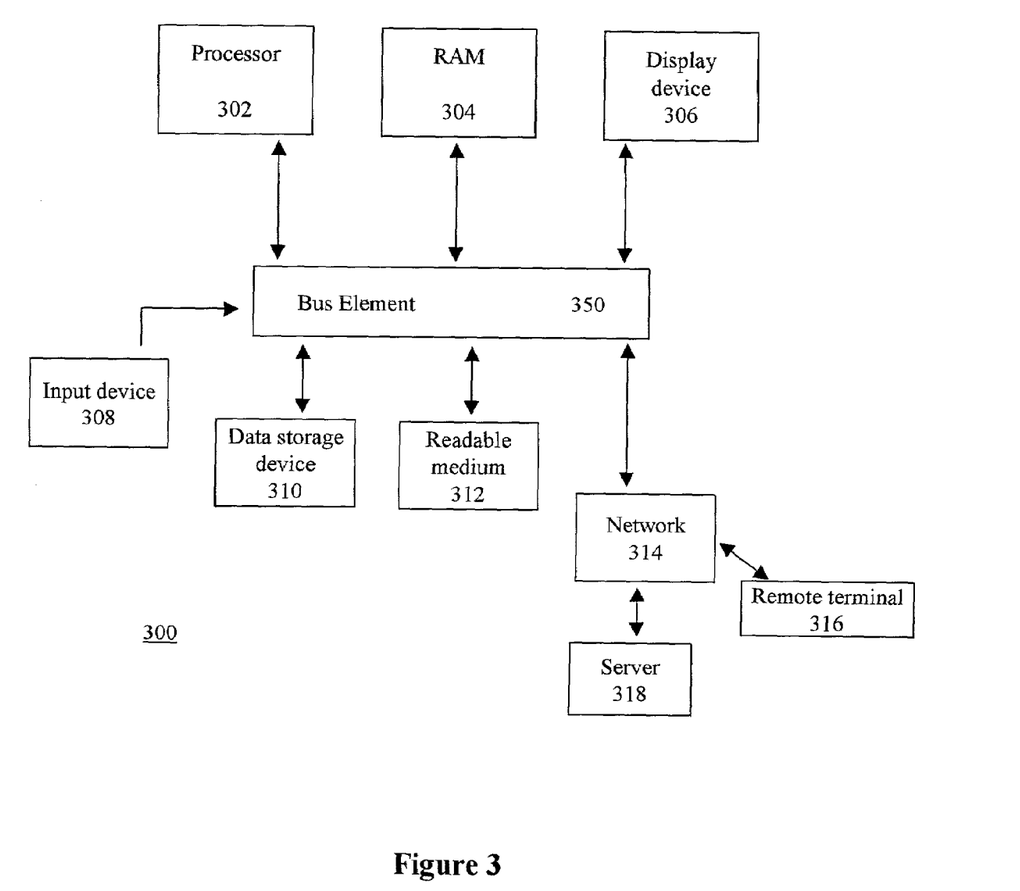
FIG. 3 illustrates a sample processing system capable of being operated as a system for signing and verifying multiple object components according to an embodiment of the present invention.

FIG. 3 illustrates a sample processing system capable of being operated as a system for signing and verifying multiple object components according to an embodiment of the present invention. Herein, a general-purpose computer system 300 is illustrated. Such a computer system architecture 300 comprises a bus element 350 for communicating information. Various elements are coupled with the bus element 350, including a processor 302, a random access memory (RAM) 304, a display device 306, an alphanumeric and other input device 308, a data storage device 310, a readable medium 312 and a network 314. The processor 302 is utilized for processing audio, video and data information. The RAM 304 stores information and instructions for the processor 302. The display device 306 displays information to the computer user, while the alphanumeric and other type of input device 308 communicate information and command selections to the processor 302. The data storage device 310, such as a magnetic disk and disk drive, stores information and instructions. The readable medium 312, such as a floppy disk or a CD, retrieves information and instructions for the processor 302. The bus element 300 is further coupled to network 314 for accessing resources on the network 314, such as server 318 and remote terminal 316. Although FIG. 3 illustrates a general purpose computer system, the system and method of the present invention may also be programmed or implemented in various types of similar systems according to other embodiments of the present invention. Modification may also be made to the general-purpose computer system, such as including a second bus element or a second processor.

Embodiments of the present invention are related to the use of the system 300 as a system for signing and/or verifying multiple object components from one common SBDF. According to one embodiment, such processing may be performed by the system 300 in response to the processor 302 executing sequences of instructions in the memory 304. Such instructions may be read into the memory 304 from another computer-readable medium, such as data storage device 310, or from another source, such as the network 314. Execution of the sequences of instructions stored in the memory 304 causes the processor 302 to execute the signing and/or verifying of multiple object components according to the embodiment. In an alternative embodiment, hardware circuitry may be used in place of or in combination with software instructions to implement embodiments of the present invention. Thus the present invention is not limited to any specific combination of hardware circuitry and software.

Figure 4:
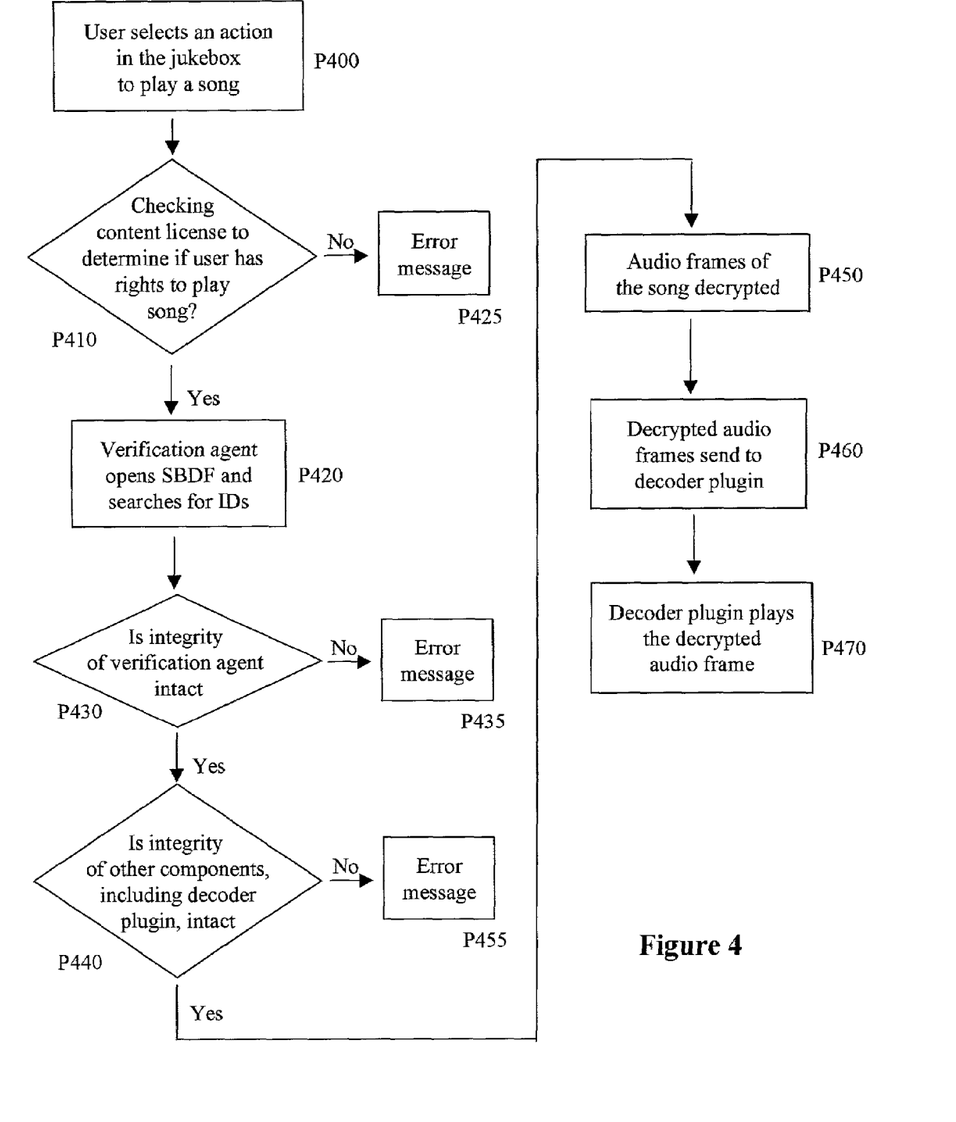
FIG. 4 shows an illustrative example that utilizes a multiple components signed binary description file and verification process according to an embodiment of the present invention.

FIG. 4 shows an illustrative example that utilizes a multiple components SBDF and multiple components verification process according to an embodiment of the present invention. In this illustrative example, audio verification is implemented, and in particular, the example allows for securing music in a software jukebox that contains many components, such as codes, plugins, agents and modules. The music may be asked to be played, downloaded from a source, uploaded to a destination, etc. Generally, each song in the jukebox is related to a unique verification agent. The relationship between each song and each verification agent, along with content license and SBDF, are stored in a database at the client side. Multiple components are signed in the SBDF, which includes unique identification names and component license information corresponding to the unique identification names. Each unique identification name identifies a particular component, and the component license information for each unique identification name may, for example, contain the hash of the component binary, private and/or public keys associated with the component, callback information, and other attributes.

When the user opens the jukebox, programs within the jukebox initialize the path information of the verification agents, content license and the SBDF from the client database. Upon opening the jukebox, the user is likely presented with a menu that includes various songs, from which the user may select for playing, downloading or uploading purpose. In block P400, when the user chooses or clicks on one of the songs, a decoder plugin that decodes the song is called. However, before the decoder plugin can decode the song, the user and various components related to playing the song are first verified. This requires the calling of the verification agent related to the song. This is accomplished by looking at the initialized path information and the relationship between the song and the verification agent stored in the client database.

In block P410, the verification agent checks a content license for the rights information related to playing the song, and it is determined whether the user has the rights to play the song. The content license stores predefined information related to all the components, such as the user rights level to run programs/components that are required to play the song. For example, the user may be required to pay subscription fees before he/she can play songs using the jukebox, so the user rights level may be established by whether or not the user has subscribed to the service. If it is determined that the user has the right to play the song, the verification agent opens the SBDF and searches for unique identification names that corresponds to itself and to other predefined components, as shown in block P420. The predefined components are those components that are required for playing the song. Examples of the components are the decoder plugin, the machine binding plugin and dynamic modules/components. On the other hand, if it is determined that the user does not have the right to play the song, the song is not played and the verification agent returns an error message, as shown in block P425.

After the verification agent finds the unique identification names related to itself and other predefined components, the verification agent proceeds with first the verification of itself, as shown in block P430, and then the verification of the other predefined components, as shown in block P440. In block P430, the verification agent first retrieves the keys and other information needed to proceed with the verification of itself. The verification agent may, for example, ensure its own integrity by validating its own digital signature associated with the unique identification name. If the verification agent is unable to verify itself, an error message is returned in block P435. If the verification agent is able to verify itself, the process continues to the next step in block P440. After the verification agent verifies itself, keys and other related license information pertinent to the predefined components are used to proceed with the verification of the other components. This information may be retrieved along with the keys and other information needed to verify the verification agent, or it may be retrieved at a later stage. Once the component license information is retrieved, verification of the predefined components proceeds.

In block P450, if it is determined that all the necessary agents and/or components are verified, the verification agent then proceed to decrypt the audio frames of the song to allow the decoder plugin to play the decrypted frames. In one implementation, the verification agent uses the keys, other information extracted from the content license, and its component part of the SBDF to decrypt the audio frames. On the other hand, if it is determined that one of the agents or components is not verified, the process stops and an error message is returned, as shown in block P455. In block P460, the verification agent then sends the decrypted audio frames to the decoder plugin through, for example, a callback mechanism. In block P470, the plugin plays the decrypted audio frames. Thus, audio verification is implemented, and music is secured in a software jukebox.

In the above audio verification example, the music being secured in a software jukebox is stored at the client site. The music, comprising of a number of songs with their audio frames encrypted, may, for example, be stored in the client database, along with the verification agent relationships, the content license and the SBDF. The music may also be stored in a separate storage area at the client site. However, according to one embodiment of the present invention, audio verification is performed in a network environment, securing music that is to be played in a network environment. The network environment comprises a client site and a server site. The songs are first stored in the server site. Instead of being on the client site, the database that stores the relationships between songs and related content license, SBDF and plugin is on the server site. Processes similar to the aforementioned process at the client site will apply, except the frames that needs to be played real time are sent encoded and encrypted through the network into the client site. The client site then verifies that the right verification agent is associated with the audio frames sent by the server and proceeds with the verification and decryption of the audio frame.

According to an embodiment of the present invention, the system for signing and verifying multiple components is applied to the management of multiple versions of components of a software system. This is applicable to a software system that has multiple versions of components, wherein the software system has to be backward compatible. For example, all the components for backward compatibility from the first release of the software system product to the latest one are stored in one SBDF. Each of the components is stored in the SBDF as a separate components with a different identification. This way, a user is able to perform the same function with a different release of the software system without having to request a different SBDF. For example, in the case of a Real™ player jukebox with multiple version of an audio code plugin or verification agent, the user is able to play the same content protected song with all these different versions of the code plugin without having to download many different SBDFs for all the different versions of the plugin. Currently, each version of each component needs to have a different SBDF since the components are different in size and content.

It is noted that relationships between and among components may be freely defined at the discretion of a programmer. For example, in the case of a jukebox, all the components, such as plugin, dynamic module/component, codes, modules or agents, that are used for playing a song will be related to one SBDF. In another example, which relates to versioning, all the verification agents from the first release of a jukebox product to the latest release are related to one SBDF so that a user may play the same song from different release of the jukebox without having to request a SBDF.

Many advantages are intrinsic to the present invention for verifying integrity of a system with multiple components. For example, the expense of signature verification is reduced by collecting all of the signatures in one SBDF. This reduction translates into input/output (I/O) speed increase and size reduction of the overall project components. The I/O speed and the reduction in size of the overall project components typically depends on what the process carried out by the program, how many components are involved in the process, and the choice of relationship between the SBDF and the components. For example, in a process with 20 different components, the size reduction is about 30% and the I/O speed increase is about 30%. This is because the number of SBDFs is reduced from 20 to 1. The magnitude change increases with the number of components and the more choices given in the relationship between components and the SBDF.

The signed binary distribution system is also greatly simplified since only one SBDF is utilized to manage all of the component licenses. By using one SBDF, it is possible to achieve greater scalability for larger systems with multiple plug-ins, codes, agents and/or modules, and improve management of larger applications where multiple object modules and components have to be signed and verified. Moreover, in case where a software system having multiple versions of components needs to be backward compatible, version management becomes less complicated because every version can be stored in the SBDF as a separate component with a different identification name. Using a single SBDF for all the components also eases the identification of a particular configuration of a software system. For example, all the input and output codes of a particular player type may be easily identified as part of that player by simply verifying them against their unique associated SBDFs.

While the foregoing description refers to particular embodiments of the present invention, it will be understood that the particular embodiments have been presented for purposes of illustration and description. They are not intended to be exhaustive or to limit the invention to the precise forms disclosed. Many modifications and variations are possible in light of the above teachings and may be made without departing from the spirit thereof. For example, to further secure the present invention, the unique identifications for the related object components may be hashed or encrypted before they are to be stored in a common SBDF. Aside from the unique identifications, important information may also be hashed or encrypted to provide additional security. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method for generating a signed binary description file for multiple components, the method comprising:
    receiving a plurality of unique identification (ID) names for a plurality of related components;
    receiving a plurality of sets of component license information for the plurality of related components, each ID name being in correspondence with a set of component license information, each set component license information including a hash of a corresponding component and related information signed with a key;
    associating each set of component license information along with a corresponding ID name to form an ID name and component license information pair;
    storing the associated pairs in a signed binary description file.

2. The method of claim 1, wherein the plurality of related components includes at least one of a program module, a plugin module, a verification agent module, code and dynamic module/component.

3. The method of claim 1, wherein information related to all the components is stored in the signed binary description file as a separate content license.

4. The method of claim 1, wherein the component license information is information related to a particular component, including at least one of a hash of the component binary, a private key associated with the component, a public key associated with the component, and callback information associated with the component.

5. The method of claim 1, wherein the unique ID name is encrypted.

6. The method of claim 1, wherein the key is a private manufacture's key.

7. The method of claim 1, wherein dynamic modules/components and callback addresses are further associated with a corresponding associated pair.

8. The method of claim 1, wherein user attributes and reserve attributes are further associated with a corresponding associated pair.

9. A method for verifying integrity of a system with multiple components, the method comprising:
    loading a plurality of components to be verified, each component providing at least one service, one of the components being a verification agent that verifies other components;
    searching a signed binary description file for a unique ID name for each of the plurality of components to be verified;
    retrieving related license information pertinent to each of the components by looking at the component license information associated to the corresponding ID name, wherein the integrity of each of the components is verified using the retrieved component license information before providing service, the verification agent verifying other components after verifying its own integrity.

10. The method of claim 9 further comprising loading a main process that requires the loading of the plurality of components to be verified.

11. The method of claim 10, wherein the main process is at least one of a digital data playing application and a digital data downloading application.

12. The method of claim 11, further comprising decryption of audio frames after the verification agent is verified, wherein keys and information extracted from a content license and a corresponding component license portion are used for the decryption.

13. The method of claim 10, further comprising loading an agent module to analyze a content license in the signed binary data file to examine predefined information related to all the object components.

14. The method of claim 13, wherein the agent module checks the content license to determine whether a user has rights to run the main process.

15. The method of claim 9, wherein a signed binary data file parser library is utilized to retrieve a pointer that points, in the signed binary data file, to information related to a particular component.

16. A verification system for verifying integrity of a software system, comprising:
    a plurality of related object components that form the software system;

a signed binary description file manager that generates a signed binary description file to store verification and license information of the plurality of related object components; and a verification agent that verifies itself and the plurality of related object components, wherein the signed binary description file manager associate unique identification (ID) names that represents the plurality of related object components with sets of component license information corresponding to the plurality of related object components in pairs, the associated ID name and component license information pairs being stored in the signed binary description file, the verification agent retrieving license information pertinent to itself and each of the related object components utilizing the signed binary description file, the verification agent verifying the related object components after verifying its own integrity.

17. The verification system of claim 16, wherein the plurality of related object components includes at least one of a program module, a plugin module, a verification agent module, code and a dynamic module/component.

18. A computer readable medium for use in conjunction with a signing system, the computer readable medium including computer readable instructions encoded thereon for:

receiving a plurality of unique identification (ID) names for a plurality of related components;

receiving a plurality of sets of component license information of the plurality of related components, each ID name being in correspondence with a set of component license information, each set component license information includes a hash of a corresponding component and related information signed with a key;

associating each set of component license information along with a corresponding ID name to form an ID name and component license information pair; and storing the associated pairs in a signed binary description file.

19. The computer readable medium of claim 18, wherein the plurality of related components includes at least one of a program module, a plugin module, a verification agent module, code and a dynamic module/component.

20. A computer readable medium for use in conjunction with a verification system, the computer readable medium including computer readable instructions encoded thereon for:

loading a plurality of components to be verified, each component providing at least one service, one of the components being a verification agent that verifies other components;

searching a signed binary description file for a unique ID name for each of the plurality of components to be verified;

retrieving related license information pertinent to each of the components by looking at the component license information associated to the corresponding ID name, wherein the integrity of each of the components is verified using the retrieved component license information before providing service, the verification agent verifying other components after verifying its own integrity.

21. The computer readable medium of claim 20, further comprising computer readable instruction encoded thereon for loading a main process that requires the loading of the plurality of components to be verified.

22. The computer readable medium of claim 20, wherein the main process is at least one of a digital data playing application and a digital data downloading application.

* * * * *